US008144669B2

(12) United States Patent
Le et al.

(10) Patent No.: US 8,144,669 B2
(45) Date of Patent: *Mar. 27, 2012

(54) SYSTEM AND METHOD FOR BEST EFFORT SCHEDULING

(75) Inventors: Lich Le, Carlsbad, CA (US); Ash Kapur, Frederick, MD (US); Victor Zhodzishsky, North Potomac, MD (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/615,619

(22) Filed: Dec. 22, 2006

(65) Prior Publication Data

US 2007/0097941 A1    May 3, 2007

Related U.S. Application Data

(63) Continuation of application No. 09/927,125, filed on Aug. 10, 2001, now Pat. No. 7,154,877.

(51) Int. Cl.
*H04J 3/00* (2006.01)
(52) U.S. Cl. ........ 370/336; 370/345; 370/458; 455/41.2
(58) Field of Classification Search ................... 455/445, 455/456.2, 517, 521; 709/227; 379/88.17; 370/230, 277, 280, 294, 321, 328, 337, 347, 370/28 O
See application file for complete search history.

(56) References Cited

U.S. PATENT DOCUMENTS

| | | | |
|---|---|---|---|
| 3,980,399 A | 9/1976 | Howden | |
| 5,613,211 A | 3/1997 | Matsuno | |
| 5,805,343 A | 9/1998 | Kozasa et al. | |
| 5,875,184 A * | 2/1999 | Altvater et al. | 370/330 |
| 5,886,993 A * | 3/1999 | Ruszczyk et al. | 370/451 |
| 6,044,091 A * | 3/2000 | Kim | 370/508 |
| 6,078,959 A * | 6/2000 | Wright et al. | 709/227 |
| 6,097,707 A * | 8/2000 | Hodzic et al. | 370/321 |
| 6,097,958 A * | 8/2000 | Bergen | 455/456.2 |
| 6,370,381 B1 * | 4/2002 | Minnick et al. | 455/445 |
| 6,404,750 B1 * | 6/2002 | Wicker et al. | 370/329 |
| 6,490,256 B1 * | 12/2002 | Jones et al. | 370/277 |
| 6,654,957 B1 * | 11/2003 | Moore et al. | 725/111 |
| 6,661,552 B2 | 12/2003 | Hira | |
| 6,744,780 B1 * | 6/2004 | Gu et al. | 370/450 |
| 6,865,165 B1 | 3/2005 | Huttunen | |
| 6,865,169 B1 | 3/2005 | Quayle et al. | |
| 2002/0075844 A1 * | 6/2002 | Hagen | 370/351 |
| 2002/0081978 A1 * | 6/2002 | Hou et al. | 455/67.1 |
| 2003/0035213 A1 | 2/2003 | Ogawa | |
| 2003/0142896 A1 | 7/2003 | Kikuchi et al. | |
| 2005/0117347 A1 | 6/2005 | Melpignano et al. | |
| 2007/0076856 A1 * | 4/2007 | Gummalla et al. | 379/88.17 |
| 2007/0127469 A1 * | 6/2007 | Rashid et al. | 370/389 |

OTHER PUBLICATIONS

Specification of the Bluetooth System, Wireless Connections Made Easy v. 1.0B Dec. 1, 1999, pp. 1-1080 Specification vol. 1.

* cited by examiner

*Primary Examiner* — Dwayne Bost
*Assistant Examiner* — Inder Mehra
(74) *Attorney, Agent, or Firm* — Thomas, Kayden, Horstemeyer & Risley, LLP.

(57) ABSTRACT

A system and method for increasing bandwidth usage between an access point and a wireless device are described. One embodiment can include an access point, a prioritizer, and a priority storage device. These components can increase bandwidth usage between an access point and a wireless device by allocating previously unused transmission slots.

43 Claims, 4 Drawing Sheets

SYSTEM AND METHOD FOR BEST EFFORT SCHEDULING

CROSS-REFERENCE TO RELATED APPLICATIONS/INCORPORATION BY REFERENCE

The present application is a CONTINUATION of U.S. patent application Ser. No. 09/927,125, filed Aug. 10, 2001.

The above-identified application is hereby incorporated by reference herein in its entirety.

FIELD OF THE INVENTION

The present invention relates to access points for wireless devices. In particular, but not by way of limitation, the present invention relates to systems and methods for best effort scheduling of an access point's transmission slots.

BACKGROUND OF THE INVENTION

The proliferation of portable, wireless devices has created a high demand for systems and methods to provide connectivity to various networks. One protocol that has been developed to provide such connectivity is Bluetooth, which is described in *The Specification of the Bluetooth System*, v1.0 B, Dec. 1, 1999 and is incorporated herein by reference. Bluetooth defines a communication protocol for wireless devices, such as personal digital assistants (PDAs). For example, FIG. 1 shows one implementation of a Bluetooth system 100 that includes a plurality of access points 115 connected to servers 120 through a network 110. Wireless devices 105 that are near the access points 115 can interact with the servers 120 through one of the access points 115. In some systems, the wireless devices 105 can access other devices such as peripheral devices, private networks, other wireless systems, etc.

Typically, Bluetooth-enabled access points have limited range and limited connection capacity. Bluetooth, for example, presently limits to seven the number of wireless devices that can actively connect to an access point. Additionally, Bluetooth limits the interaction between an access point and the wireless devices connected to it. For example, a wireless device can only transmit data to the access point when it is polled by that access point. To prevent blocking, i.e., to prevent one wireless device 105 from using all of the bandwidth, an access point 115 is required to poll each actively connected wireless device every N transmission slots, where N is defined by the clock accuracy of the wireless devices, by default, or by quality of service (QOS) parameters. In a simplified example, if there were five transmission slots per cycle and five wireless devices, then each device would get polled once per cycle.

This type of round robin scheduling assumes that each wireless device has the same amount of data to upload to the access point and that the upload rate will be constant. Modem communications, however, tend to be bursty rather than constant, and because Bluetooth does not define a method for addressing the bursty flow of data, present systems cause some wireless devices to be idle when they could otherwise be uploading data to the access point. Consider, for instance, the hypothetical case with ten transmission slots per cycle and five wireless devices connected to one of the access points. As before, each wireless device should get polled at least once each cycle. Present access points, for example, would poll the five wireless devices in the first five transmission slots and then poll none of the devices during the next five transmission slots. Table 1 illustrates the transmission slot allocation of such present access points. As is illustrated, no wireless device is capable of uploading data to the access point during transmission slots 6-10.

TABLE 1

| | Transmission slot allocation | | | | | | | | | |
|---|---|---|---|---|---|---|---|---|---|---|
| Transmission Slot | 1 | 2 | 3 | 4 | 5 | 6 | 7 | 8 | 9 | 10 |
| Device Being Polled | 1 | 2 | 3 | 4 | 5 | EMPTY | EMPTY | EMPTY | EMPTY | EMPTY |

By not allocating the empty transmission slots, e.g., slots 6-10, to any wireless device, present access points waste precious bandwidth and slow the exchange of data with wireless devices. Because high bandwidth is one key to commercial success of Bluetooth-based and other wireless devices, a system and method is needed to better utilize transmission slots available to access points.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

The present invention can provide a system and method for increasing bandwidth usage between an access point and a wireless device. One embodiment of the invention can include an access point, a prioritizer, and a priority storage device. Together, these components can increase bandwidth usage between an access point and a wireless device by allocating previously unused transmission slots.

For example, the access point can establish an initial polling rate with a number of wireless devices and poll each of those devices according to that established rate. For Bluetooth-enabled wireless devices, data can generally only be transferred to the access point after being polled by the access point. Thus, the number of times that the access point polls a wireless device is directly related to the amount of data that the device can upload to the access point. The wireless devices, however, are not required to upload data responsive to being polled and in many cases do not.

Whether or not a particular device uploads data responsive to being polled, the amount of data—or lack thereof—that a wireless device transfers to the access point can be stored and used to calculate a priority for that device. If, for example, a particular wireless device transferred the maximum allowed amount of data to the access point, it could receive a higher priority than a device that transferred a small amount of data. Some embodiments of the present invention, however, store indicators other than the amount of data. For example, one embodiment involves the wireless device transmitting to the access point a flag that indicates that more data needs to be uploaded.

The priority assigned to a particular wireless device could be based solely upon the previous cycle's uploading activity, or it could be based upon the uploading activity in a number of previous cycles. For example, a priority can be assigned to a wireless device based upon uploading activity for the wireless device over the prior three cycles. In this type of system when multiple cycles are used to calculate the priority, the priority can be based on a straight average of the uploading activity over the last few cycles or based upon a weighted average of the uploading activity over the last few cycles. Of course, those of skill in the art could calculate the priority factor in a number of ways using any number of polling cycles.

Using the calculated priorities for the wireless devices actively connected to the access point, one embodiment of the present invention can allocate otherwise unallocated transmission slots to the wireless device(s) with a higher priority. In other words, an access point can poll a wireless device with a high priority during a time slot that previously would have gone unused. Transmission slots that are allocated based upon priority are referred to as priority allocated transmission slots.

In some embodiments, all unallocated transmission slots are allocated to the single wireless device with the highest priority, and in other embodiments, the unallocated transmission slots are divided among multiple higher priority devices. In either case, however, a wireless device's uploading activity during these priority allocated transmission slots can be recorded and used to modify the priority for that wireless device. For example, if the wireless device receives five priority allocated transmission slots and only fully uses three of them, that device's priority can be reduced, thereby possibly making the unused transmission slots in the next cycle available to some other wireless device.

As previously stated, the above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
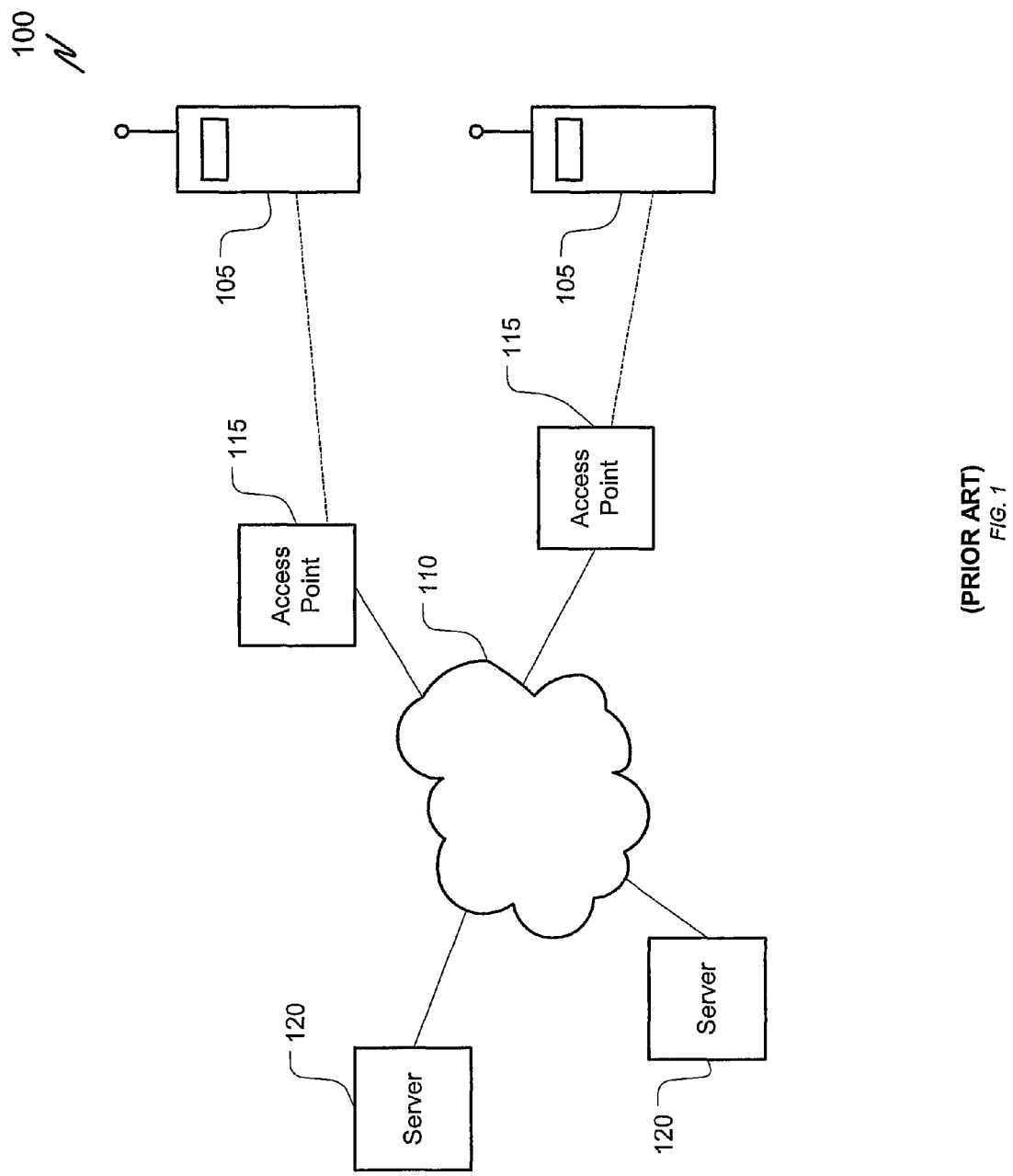
FIG. 1 is a block diagram of an existing network and network access system.
Figure 2:
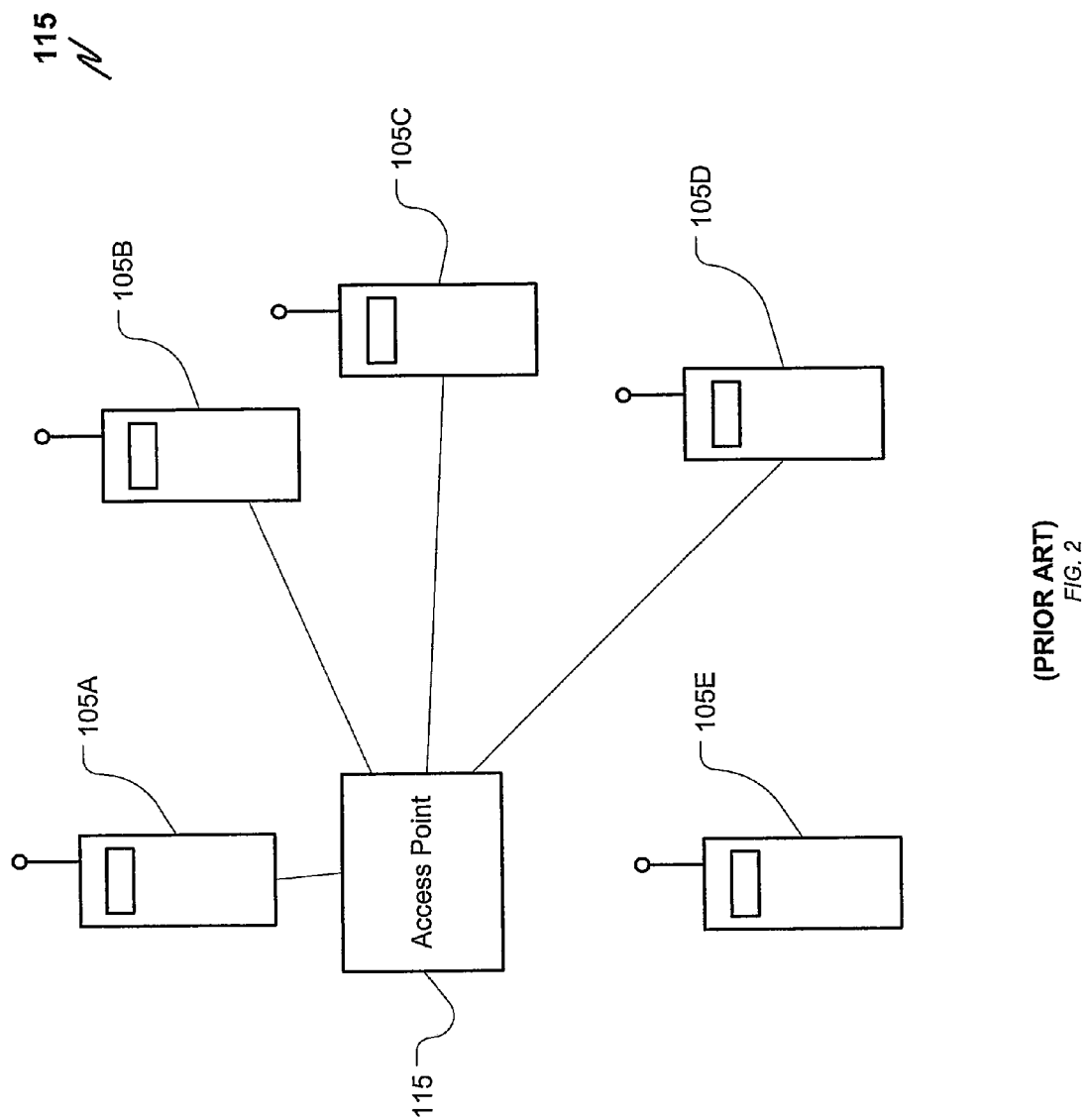
FIG. 2 is a block diagram of an existing network access system.

Referring now to the drawings, where like or similar elements are designated with identical reference numerals throughout the several views, and referring in particular to FIG. 2, it is a block diagram of an existing network access point 115. In this implementation, the access point 115 is hard-wired to a network 110 (shown in FIG. 1). In other versions, however, the access point 115 could be connected to the network 110 through a high-speed wireless link or other link (not shown).

To access the network 110, a wireless device 105 within range of an access point 115 establishes a connection with that access point. Once a connection is established, the wireless device 105 can receive information from and transmit information to the network 110 via the access point 115. In FIG. 2, wireless devices 105A, 105B, 105C and 105D are actively connected to the network (shown by dashed line) and wireless device 105E is either not connected or in, for example, a Bluetooth-defined PARK mode.

Figure 3:
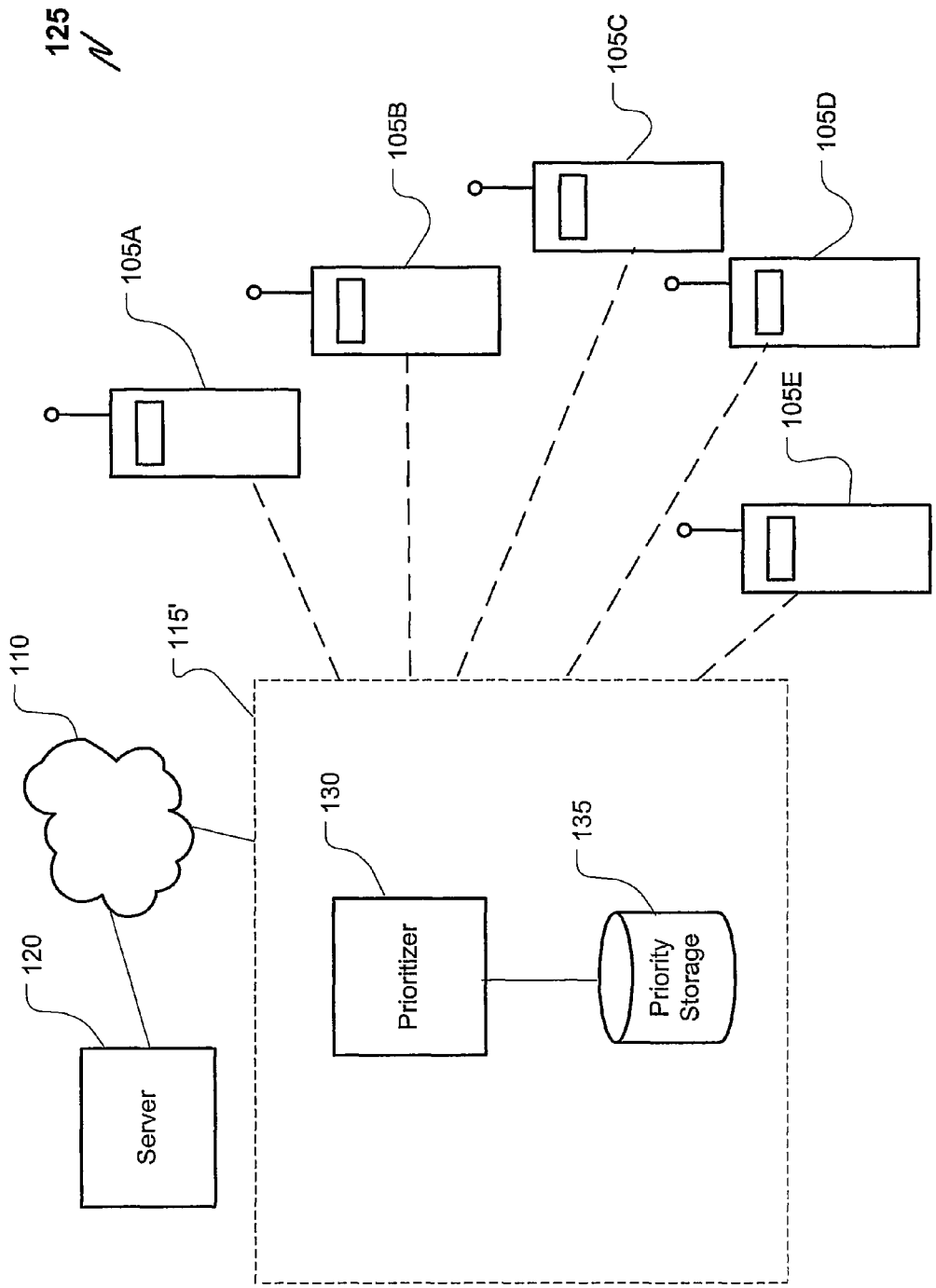
FIG. 3 is a block diagram of one embodiment of a network access system constructed in accordance with the principles of the present invention.

Referring now to FIG. 3, it is a block diagram of one embodiment of a network access system 125 constructed in accordance with the principles of the present invention. This embodiment includes an access point 115', a prioritizer 130, and a priority storage module 135. Although these components are shown separately, one skilled in the art can recognize that the components can be combined and housed as a single component.

As with the access point 115 described with relation to FIG. 2, wireless device 105 can establish a connection with the access point 115' of FIG. 3 and thereby access the network 110. In this embodiment, however, the prioritizer 130 and the priority storage module 135 allocate transmission slots that would not have been allocated by the conventional access point 115 of FIG. 2. The operation of the inventive access point 115' of FIG. 3 is best illustrated by reference to the flowchart of FIG. 4 and the accompanying text.

Figure 4:
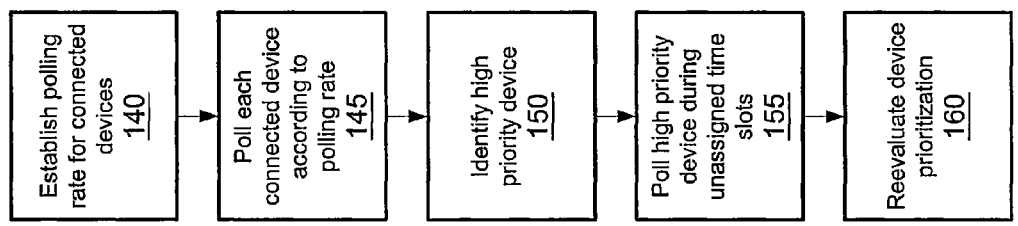
FIG. 4 is a flowchart of one method according to the present invention for operating a network access system.

Referring now to FIG. 4, the network access system 125 operates by establishing an initial polling rate for the wireless devices 105A-E (step 140). The method of establishing this polling rate is well known in the art and, thus, is not described herein. After the initial polling rate has been established, the access point 115' begins polling each of the actively-connected wireless devices 105A-E (step 145). The prioritizer records, in the priority storage module 135, the amount of data, or some indicator thereof, that each wireless device 105 uploads to the access point 115'. Using that recorded data, the prioritizer 130 calculates a priority (or ranking) for the wireless devices 105 (step 150). Next, the prioritizer 130 allocates unassigned transmission slots to the wireless device 105 with the highest priority and causes the access point 115' to poll the wireless device 105 for each of those transmission slots (step 155). Assuming that the prioritizer 130 determines that wireless device 105A has the highest priority for the next cycle and that wireless devices 105A-E are actively connected to the access point 115, Table 2 represents an exemplary time slot allocation.

TABLE 2

| | Transmission slot allocation | | | | | | | | | |
|---|---|---|---|---|---|---|---|---|---|---|
| Transmission Slot | 1 | 2 | 3 | 4 | 5 | 6 | 7 | 8 | 9 | 10 |
| Device Being Polled | 105A | 105B | 105C | 105D | 105E | 105A | 105A | 105A | 105A | 105A |

The prioritizer 130 can also record the upload activity of a wireless device 105 during the priority allocated transmission slots and change that device's priority accordingly. For example, the prioritizer can record the activity of wireless device 105A over transmission slots 6-10 as shown in Table 2 and adjust the priority of device 105A to reflect its uploading activity during those time periods.

In certain embodiments, before a wireless device 105 is finished uploading data to the access point 115', the device 105 may include an indicator, e.g., flag, in the uploaded data that indicates that more data is to follow. When the uploaded data includes such an indicator, the prioritizer 130 can change the device's priority accordingly. For example, if wireless device 105A included an indicator in its uploaded data in transmission slot 7 (as shown in Table 3), that device's priority could be lowered and transmission slots 8-10 reallocated to a different wireless device 105 (step 160). Alternatively, the prioritizer 130 could finish the cycle with the priorities as they are and adjust the priorities for the next cycle. In other words, the access point 115' could still poll wireless device 105A during transmission slots 8-10 despite receiving an end-of-upload indicator. Device 105A's priority, however, could be changed for the next cycle.

TABLE 3

| Transmission slot allocation | | | | | | | | | | |
|---|---|---|---|---|---|---|---|---|---|---|
| Transmission Slot | 1 | 2 | 3 | 4 | 5 | 6 | 7 | 8 | 9 | 10 |
| Device Being Polled | 105A | 105B | 105C | 105D | 105E | 105A | 105A | 105D | 105D | 105D |

In conclusion, the present invention provides, among other things, a system and method for increasing bandwidth usage between an access point and a wireless device. Although embodiments of the present invention are described with relation to Bluetooth and access points, those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method for providing wireless communications over allocated and unallocated transmission slots of a polling cycle in a Bluetooth system, comprising:
   polling a first Bluetooth-enabled wireless device according to a Bluetooth protocol;
   recording upload activity received from the first wireless device in response to the polling to determine whether one or more allocated transmission slots allocated to the first wireless device are being used to transfer a maximum amount of data allowed by the one or more allocated transmission slots; and
   allocating one or more of a plurality of unallocated transmission slots to the first wireless device based on the recorded upload activity if it is determined that the one or more allocated transmission slots allocated to the first wireless device are being used to transfer the maximum amount of data allowed by the one or more allocated transmission slots, wherein the Bluetooth system is configurable to reallocate transmission slots in the cycle in which the recorded upload activity is received and configurable to reallocate transmission slots in a subsequent cycle to the cycle in which the recorded upload activity is received.

2. The method according to claim 1, comprising:
   determining a first priority for the first wireless device based on the recorded upload activity.

3. The method according to claim 1, comprising:
   polling a second wireless device; and
   recording the upload activity by the second wireless device.

4. The method according to claim 3, comprising:
   determining a priority for the second wireless device based on the recorded upload activity for the second wireless device.

5. The method according to claim 4, comprising:
   determining a priority for the first wireless device based on the recorded upload activity for the first wireless device.

6. The method according to claim 5, comprising:
   determining which wireless device has a higher priority.

7. The method according to claim 6, wherein the wireless device with the higher priority can change from cycle to cycle.

8. The method according to claim 1, wherein the recording of the upload activity comprises recording an amount of data uploaded from the first wireless device.

9. The method according to claim 1, wherein the recording of the upload activity comprises recording an indicator that more data needs to be uploaded from the first wireless device.

10. The method according to claim 1, wherein the wireless communications comprises Bluetooth wireless communications.

11. The method according to claim 1, wherein the first wireless device comprises a Bluetooth-enabled personal digital assistant (PDA).

12. The method according to claim 1, wherein the method is performed by a Bluetooth-enabled access point.

13. The method according to claim 1, wherein the method is performed by an access point.

14. The method according to claim 1, wherein the wireless communications are bursty.

15. The method according to claim 1, comprising:
   calculating a number of the plurality of unallocated transmission slots to be allocated to the first wireless device in a present cycle based upon the recorded upload activity from the first wireless device over a previous cycle.

16. The method according to claim 1, comprising:
   calculating a number of the plurality of unallocated transmission slots to be allocated to the first wireless device in a present cycle based upon the recorded upload activity from the first wireless device over a plurality of previous cycles.

17. The method according to claim 1, wherein a present cycle comprises N transmission slots that include the one or more allocated transmission slots and the one or more unallocated transmission slots, wherein M wireless devices are connected and polled, wherein the M wireless devices includes the first wireless device, wherein N and M are integers, wherein M is less than N, wherein M of the N transmission slots are allocated to the M wireless devices, and wherein N-M of the N transmission slots are allocated to the first wireless device because the first wireless device has a highest calculated priority of the M wireless devices based on a previous cycle or previous cycles.

18. The method according to claim 1, comprising:
polling a second wireless device in a same cycle as the polling of the first wireless device;
recording the upload activity received from the second wireless device in response to the polling of the second wireless device to determine whether one or more allocated transmission slots allocated to the second wireless device are being used to transfer a maximum amount of data allowed by the one or more allocated transmission slots; and
allocating one or more of the plurality of unallocated transmission slots to the first wireless device and the second wireless device if it is determined that the one or more allocated transmission slots allocated to the first wireless device and the second wireless device are being used to transfer the maximum amount of data allowed by the one or more allocated transmission slots.

19. The method according to claim 18, wherein the allocation of the one or more of the plurality of unallocated transmission slots in a present polling cycle to the first wireless device and the second wireless device is based on a calculation of a priority that is calculated over a previous polling cycle.

20. The method according to claim 18, wherein the allocation of the one or more of the plurality of unallocated transmission slots in a present polling cycle to the first wireless device and the second wireless device is based on a calculation of a priority that is calculated over a plurality of previous polling cycles, and wherein the calculation of the priority is based on a straight average of the recorded upload activity over the plurality of previous polling cycles.

21. The method according to claim 18, wherein the allocation of the one or more of the plurality of unallocated transmission slots in a present polling cycle to the first wireless device and the second wireless device is based on a calculation of a priority that is calculated over a plurality of previous polling cycles, and wherein the calculation of the priority is based on a weighted average of the recorded upload activity over the plurality of previous polling cycles.

22. A wireless communications system that provides wireless communications over allocated and unallocated transmission slots of a polling cycle in a Bluetooth system, comprising:
a processor;
a storage device operatively coupled to the processor; and
a plurality of instructions stored in the storage device, the plurality of instructions configured to cause the processor to poll a first Bluetooth wireless device according to a Bluetooth protocol, to record upload activity received from the first wireless device in response to the polling to determine whether one or more allocated transmission slots allocated to the first wireless device are being used at full capacity to transfer a maximum amount of data allowed by the one or more allocated transmission slots, and to allocate one or more of a plurality of unallocated transmission slots to the first wireless device based on the recorded upload activity if it is determined that the one or more allocated transmission slots allocated to the first wireless device are being used at full capacity to transfer the maximum amount of data allowed by the one or more allocated transmission slots,
wherein the wireless communications system is configurable to reallocate transmission slots in the cycle in which the recorded upload activity is received and configurable to reallocate transmission slots in a subsequent cycle to the cycle in which the recorded upload activity is received.

23. The system according to claim 22, wherein the plurality of instructions are configured to cause the processor to determine a first priority for the first wireless device based on the recorded upload activity.

24. The system according to claim 22, wherein the plurality of instructions are configured to cause the processor to poll a second wireless device and to record the upload activity by the second wireless device.

25. The system according to claim 24, wherein the plurality of instructions are configured to cause the processor to determine a priority for the second wireless device based on the recorded upload activity for the second wireless device.

26. The system according to claim 25, wherein the plurality of instructions are configured to cause the processor to determine a priority for the first wireless device based on the recorded upload activity for the first wireless device.

27. The system according to claim 26, wherein the plurality of instructions are configured to cause the processor to determine which wireless device has a higher priority.

28. The system according to claim 27, wherein the wireless device with the higher priority can change from cycle to cycle.

29. The system according to claim 22, wherein the plurality of instructions configured to cause the processor to record the upload activity comprises instructions configured to cause the processor to record an amount of data uploaded from the first wireless device.

30. The system according to claim 22, wherein the plurality of instructions configured to cause the processor to record the upload activity comprises instructions configured to cause the processor to record an indicator that more data needs to be uploaded from the first wireless device.

31. The system according to claim 22, wherein the wireless communications system comprises a Bluetooth-enabled wireless communications system.

32. The system according to claim 22, wherein the first wireless device comprises a Bluetooth-enabled wireless device.

33. The system according to claim 32, wherein the first wireless device comprises a personal digital assistant (PDA).

34. The system according to claim 22, wherein the processor and the storage device are part of a Bluetooth-enabled access point.

35. The system according to claim 22, wherein the processor and the storage device are part of an access point.

36. The system according to claim 22, wherein wireless communications on the wireless communications system are bursty.

37. The system according to claim 22, wherein the plurality of instructions are configured to cause the processor to calculate a number of the plurality of unallocated transmission slots to be allocated to the first wireless device in a present cycle based upon the recorded upload activity from the first wireless device over a previous cycle.

38. The system according to claim 22, wherein the plurality of instructions are configured to cause the processor to calculate a number of the plurality of unallocated transmission slots to be allocated to the first wireless device in a present cycle based upon the recorded upload activity from the first wireless device over a plurality of previous cycles.

39. The system according to claim 22,
wherein the plurality of instructions are configured to cause the processor to poll a second wireless device in a same cycle as the polling of the first wireless device,
wherein the plurality of instructions are configured to cause the processor to record the upload activity received from the second wireless device in response to the polling of the second wireless device to determine whether one or more allocated transmission slots allocated to the second wireless device are being used to transfer a maximum amount of data allowed by the one or more allocated transmission slots, and
wherein the plurality of instructions are configured to cause the processor to allocate one or more of the plurality of unallocated transmission slots to the first wireless device and the second wireless device if it is determined that the one or more allocated transmission slots allocated to the first wireless device and the second wireless device are being used to transfer the maximum amount of data allowed by the one or more allocated transmission slots.

40. The system according to claim 39, wherein the allocation of the one or more of the plurality of unallocated transmission slots in a present polling cycle to the first wireless device and the second wireless device is based on a calculation of a priority that is calculated over a previous polling cycle.

41. The system according to claim 39, wherein the allocation of the one or more of the plurality of unallocated transmission slots in a present polling cycle to the first wireless device and the second wireless device is based on a calculation of a priority that is calculated over a plurality of previous polling cycles, and wherein the calculation of the priority is based on a straight average of the recorded upload activity over the plurality of previous polling cycles.

42. The system according to claim 39, wherein the allocation of the one or more of the plurality of unallocated transmission slots in a present polling cycle to the first wireless device and the second wireless device is based on a calculation of a priority that is calculated over a plurality of previous polling cycles, and wherein the calculation of the priority is based on a weighted average of the recorded upload activity over the plurality of previous polling cycles.

43. The system according to claim 22, wherein a present cycle comprises N transmission slots that include the one or more allocated transmission slots and the one or more unallocated transmission slots, wherein M wireless devices are connected and polled, wherein the M wireless devices includes the first wireless device, wherein N and M are integers, wherein M is less than N, wherein M of the N transmission slots are allocated to the M wireless devices, and wherein N-M of the N transmission slots are allocated to the first wireless device because the first wireless device has a highest calculated priority of the M wireless devices based on a previous cycle or previous cycles.

* * * * *